July 1, 1941. O. B. BEASLEY 2,247,868
ELECTRICAL CORD EXTENSION DEVICE
Filed Aug. 18, 1939
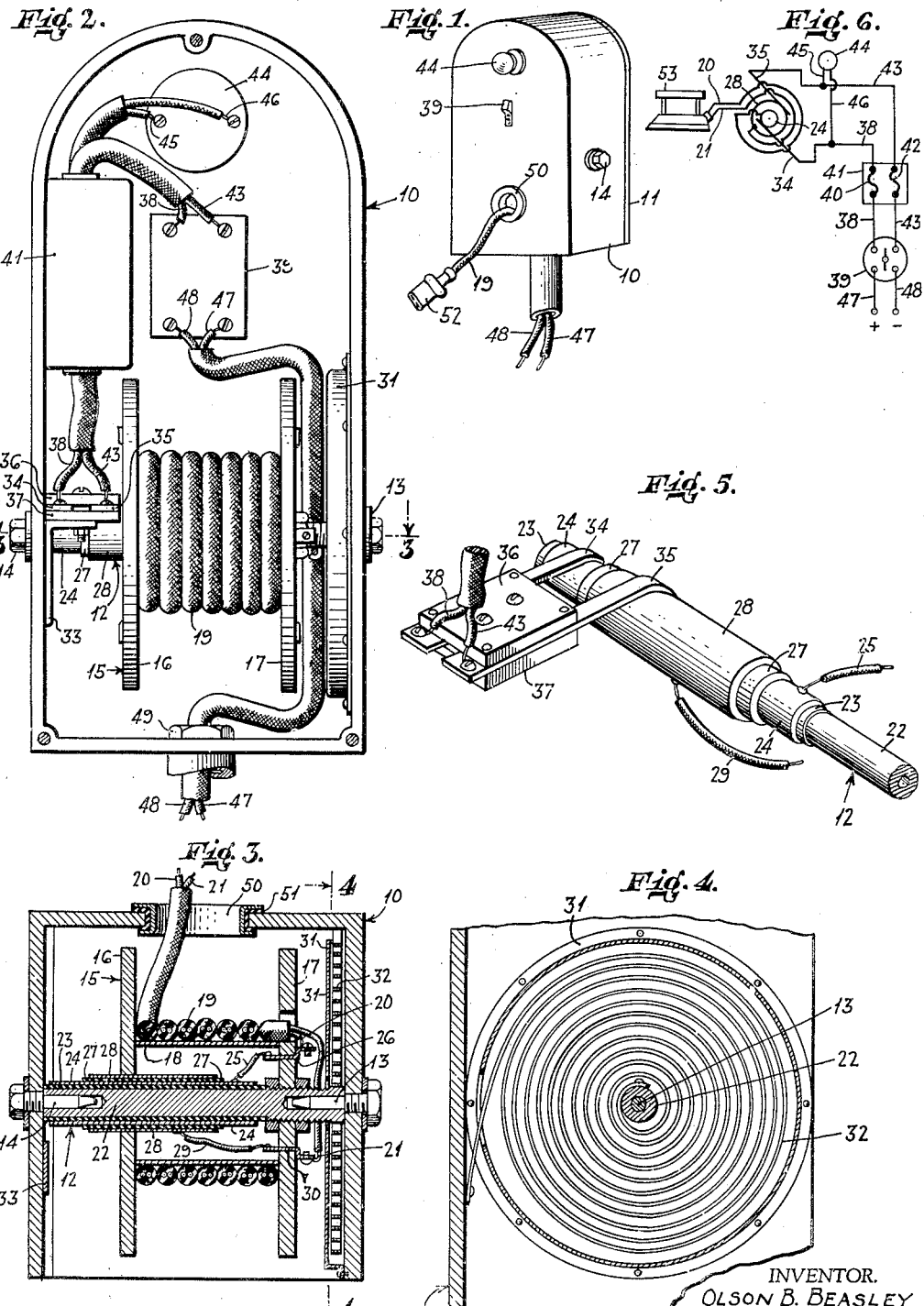
INVENTOR.
OLSON B. BEASLEY
Richard A. Geier
ATTORNEYS Patented July 1, 1941

2,247,868

UNITED STATES PATENT OFFICE 2,247,868

ELECTRICAL CORD EXTENSION DEVICE

Olson B. Beasley, Newark, N. J.

Application August 18, 1939, Serial No. 290,810

1 Claim. (Cl. 191—12.4)

This invention relates to electrical cord extension devices and, more particularly, to an ironing cord unit for an electrical iron used in stationary laundry service.

In devices heretofore used on such irons, the cords would become worn and break after little usage and also would become short-circuited.

An object of the invention is to provide an electrical ironing cord unit from which an electrical cord may be withdrawn and retracted in accordance with the movement of the iron toward and away from said device.

Another object of this invention is to provide an electrical cord extension device whereby the cord may be withdrawn therefrom and detracted thereby without substantial wear on said cord and without danger of electrical shock to the user.

A further object of this invention is to provide an electrical ironing cord unit from which a cord may be withdrawn and also rewound and from which the electrical current entering the same may be turned on or off, all live wires being contained in the unit when the current is turned off.

A still further object of my invention is to provide an electrical cord extension device having a safe and durable connection between the movable parts of the device and the stationary parts.

Other objects and advantages inherent in the invention will be obvious or will become apparent during the course of the following specification.

In accomplishing the objects of the present invention a spring actuated reel, unto which an electric cord is wound and unwound, is mounted on a spindle rotatably journaled in a housing containing the entire unit. Mounted on the spindle are two electrical contacts insulated from one another and from the reel and spindle. The contacts are rotatable with the spindle and each is connected to one wire in the ironing cord. Contacting each movable contact is a fixed contact in the form of a brush which is connected through suitable fuses and a switch to the electrical source. A pilot light is connected across the fixed contact leads to show when electric current is in the cord.

The above and other objects will appear more clearly from the following detailed description when taken in conjunction with the accompanying drawing which illustrates a preferred embodiment of the invention.

Referring to the drawing:

Figure 1 is a perspective view of the unit of this invention;

Figure 2 is an elevational view from the back of the device, the rear cover being removed;

Figure 3 is a sectional view on the line 3—3 of Figure 2;

Figure 4 is a section along the line 4—4 of Figure 3, showing the retracting spring;

Figure 5 is a perspective view of the spindle on which the cord reel is mounted showing the electrical connections thereto; and Figure 6 is a wiring diagram of the unit.

Like numerals refer to like parts throughout the several views.

Referring to the drawing, the device consists of a housing 10, having a removable rear cover 11. Mounted within the housing 10 on a spindle 12 supported on bearings 13 and 14 on opposite sides of the said housing, so that the spindle may rotate on said bearings, is a reel 15 comprising end flanges 16 and 17, preferably of non-conductive material, fastened to a body portion 18 adapted to accommodate an electrical extension cord 19 having two strands of wire 20 and 21 encased in an insulating material.

The spindle 12, as shown more particularly in Figures 3 and 5 of the drawing, consists of a main body portion 22 which is screw threaded on one end so that the reel 15 may be secured thereto. The spindle is rotatably mounted on bearings 13 and 14. Covering the main body portion 22 from the screw threads on one end to the opposite end is a strip 23 of insulating material extending longitudinally of the body portion 22.

Encasing the insulating strip 23 is a contact member 24 of conductive material to which is fastened one end of the wire 25. The wire 25 is in electrical connection through a lug 26 extending through the flange 17 with one end of the wire 20 of the extension cord 19.

Circumferentially covering the contact member 24 is an insulating strip 27 which also extends longitudinally of said contact member a distance less than the length of the contact member 24 leaving a portion of the member 24 exposed at both ends.

A second contact member 28 is mounted over the insulating strip 27 being slightly less in length than said insulating strip but completely encasing the same. The contact member 28 is in electrical connection with the wire 21 of the cord 19 through a wire 29 and a lug 30 mounted in the flange 17.

Mounted on one side of the housing 10 is a casing 31 containing a spiral spring 32 the inner end of which is connected to the body portion 22 of the spindle 12 and the outer end connected to the housing 10. When the cord 19 is withdrawn from the reel 15 by movement of the iron away from the unit, turning the spindle 12 in a clockwise direction, the spring 32 will be placed under tension, so that when the iron is returned toward the unit the reel 15 will be turned in a counter-clockwise direction by the tension of the spring 32 thereby winding the cord 19 on the reel.

A bracket 33, on which is mounted two fixed contacts 34 and 35, is fastened to one side of the housing 10 in such a position that one of the fixed contacts 34 engages the exposed surface of the contact member 24 and the other fixed contact 35 engages the exposed surface of the contact member 28. The fixed contacts 34 and 35 are mounted between insulating blocks 36 and 37.

One fixed contact 34 is connected by means of a lead 38 to one pole of a double throw snap switch 39 through a fuse 40 in a fuse box 41. The other fixed contact 35 is connected to another pole of the switch 39 through a fuse 42 by means of the lead wire 43.

The opposite poles of the switch 39 are connected to an electrical source through the lead wires 47 and 48 which are passed from the unit through a bushing 49 in the bottom of the housing 10.

All lead wires in the unit of this invention are suitably encased in insulation.

A pilot light 44 mounted in the housing 10 is connected to the leads 43 and 38 by means of lead wires 45 and 46 respectively at a point in the wires 43 and 38 prior to the connection of said wires with the fuses.

The cord 19 passes from the unit through a bushing 50 insulated from the housing 10 by means of a washer 51 of non-conductive material.

The unit may be mounted in any convenient manner.

In the use of this electrical cord extension device, the plug 52 is attached to an electric iron 53. The switch 39 is then pressed into its "on" position, allowing electrical current to pass from the electrical source wire 47 through the switch 39 into the wire 38 through the fuse 40, wire 38, into the fixed contact 34, thence through the movable contact 24 into the wire 25, thence through the lug 26 into the wire 20 of the extension cord 19, and through the extension cord to one pole of the iron. After passing through the fuse 40 the electrical current also passes into one connection of the pilot light 44 through the wire 46. The other pole of the electrical source is connected to the electrical iron through the source wire 48, switch 39, wire 43, through the fixed contact 35, the movable contact 28 on the spindle 12 thence into the wire 29 through the lug 30 into the wire 21 of the extension cord 19. The other side of the pilot light 44 is connected to the wire 43 by means of the lead wire 45 at a point after the connection of the wire 43 to the fuse 42.

Current thusly passes into the iron 53 lighting the pilot light 44 to show the operator that electrical current is passing into the iron. In use, the electrical iron will be moved away from and toward the extension cord unit. When the iron 53 is moved away from the unit the extension cord 19 will be unwound from the reel 15 turning the reel in a clockwise direction which will place the spring 32 under tension.

Upon movement of the iron toward the unit, the tension of the spring 32 will move the reel 15 in a counterclockwise direction, winding the extension cord 19 on said reel. In this manner, no slack cord is left upon the ironing board or in the way of a user but is rewound onto the reel 15.

Should the cord 19 become worn through contact with the bushing 50, so that a short circuit would take place between the wires 20 and 21, the electrical current would not pass into the housing 10, as the insulating washer 51 would prevent this.

In the unit of this invention, when the switch 39 is turned to the "off" position, there are no live wires or parts exposed, thus eliminating the possibility of shocks to the iron operator once the switch is turned off. This also permits the replacing of the cord, fuse, and pilot light, without danger of shock.

It is apparent that the specific illustrations described above and set forth in the accompanying drawing have been given by way of illustration and not by way of limitation, and that the structure above described is subject to wide variation and modification without departing from the scope or intent of this invention, all of which variations and modifications are to be included within the scope of the appended claim.

What is claimed is:

In an electrical iron extension cord device, a stationary casing, bearing members removably mounted on the opposite side of said casing and projecting inwardly thereof, a spring-urged spindle rotatably mounted on said bearing members said bearings projecting into said spindle, a reel fixedly mounted on said spindle intermediate the ends thereof said reel having a tubular body portion the ends being closed by end flanges, two annular concentric electrical contact strips one positioned within the other the inner strip projecting beyond the outer strip at both ends, the strips being mounted on said spindle and extending longitudinally thereof and concentric thereto, said strips being insulated from one another and from said spindle, one end of said strips extending beyond one end flange of said spool and the other end terminating within the tubular body thereof, two electrical terminals mounted on and extending through one of said end flanges, connecting means connecting the inner end of one terminal to one annular contact strip and the inner end of the other terminal with the other contact strip, a flexible cord comprising two electric-current conducting wires wound on said reel one end of each of said wires being connected, respectively, to the outer end of each of said terminals, the opposite end of said wires extending through said casing and being adapted for connection to an electrical iron, two fixed contacts mounted in said casing one engaging the inner contact strip on said spindle and the other the outer contact strip, each engaging said strips at the outer side of the adjacent end flange of said spool, and connecting means for connecting each fixed contact to opposite poles of an electrical source.

OLSON B. BEASLEY.